(12) United States Patent
Martin

(10) Patent No.: US 10,315,817 B2
(45) Date of Patent: Jun. 11, 2019

(54) METAL STRAPS

(71) Applicant: Hubbell Incorporated, Shelton, CT (US)

(72) Inventor: Evan Ronald Martin, Derry, NH (US)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 15/158,504

(22) Filed: May 18, 2016

(65) Prior Publication Data

US 2017/0267427 A1    Sep. 21, 2017

Related U.S. Application Data

(60) Provisional application No. 62/310,893, filed on Mar. 21, 2016.

(51) Int. Cl.
| | |
|---|---|
| *B65D 63/02* | (2006.01) |
| *B65D 63/06* | (2006.01) |
| *F16G 11/02* | (2006.01) |

(52) U.S. Cl.
CPC ............ *B65D 63/06* (2013.01); *B65D 63/02* (2013.01); *F16G 11/02* (2013.01); *Y10T 24/39* (2015.01); *Y10T 24/3933* (2015.01)

(58) Field of Classification Search
CPC ......... B65D 63/02; B65D 63/06; Y10T 24/39; Y10T 24/3933; F16G 11/02
See application file for complete search history.

(56) References Cited

U.S. PATENT DOCUMENTS

| | | | | |
|---|---|---|---|---|
| 2,174,192 A | * | 9/1939 | Meighan ............... | F16G 11/00 24/129 R |
| 2,233,083 A | * | 2/1941 | Grant .................... | B66C 1/14 24/483 |
| 2,340,183 A | * | 1/1944 | Glen ..................... | F16G 11/02 174/19 |
| 2,346,412 A | * | 4/1944 | Bratz .................... | F16G 11/02 140/102 |
| 2,631,449 A | * | 3/1953 | Protsman ............... | A44B 15/00 24/115 G |
| 2,819,923 A | * | 1/1958 | Anderson .............. | A01M 31/00 294/150 |
| 2,959,436 A | * | 11/1960 | Duda .................... | F16G 11/02 174/90 |
| 3,067,570 A | * | 12/1962 | Nischan ................ | D07B 1/185 16/108 |
| 3,239,900 A | * | 3/1966 | Bottoms ................ | B61B 12/12 24/115 R |

(Continued)

OTHER PUBLICATIONS

International Search Report and Written Opinion mailed in corresponding International Application PCT/US17/22725 dated Aug. 14, 2017.

(Continued)

*Primary Examiner* — Robert Sandy
*Assistant Examiner* — Louis A Mercado
(74) *Attorney, Agent, or Firm* — Wissing Miller LLP

(57) ABSTRACT

Metal straps used to tie or bundle one or more items are provided. The metal strap includes a length of cable and a ferrule. The ferrule is pre-attached adjacent one end of the cable, and the ferrule can receive a free end of the cable, and can secure the cable to the ferrule after the cable is wrapped around one or more items.

21 Claims, 10 Drawing Sheets

(56) References Cited

U.S. PATENT DOCUMENTS

| | | | | |
|---|---|---|---|---|
| 3,289,259 A * | 12/1966 | Laharty | ............ | B66C 1/14 |
| | | | | 294/74 |
| 3,473,199 A * | 10/1969 | Rohland | ............ | F16G 11/02 |
| | | | | 24/129 W |
| 3,683,465 A * | 8/1972 | Wernsing | ............ | F16G 11/14 |
| | | | | 24/115 R |
| 3,742,561 A * | 7/1973 | Wernsing | ............ | F16G 11/02 |
| | | | | 24/129 W |
| 3,844,601 A * | 10/1974 | Rochester, Jr. | ............ | B66C 1/12 |
| | | | | 24/114.5 |
| 4,136,539 A * | 1/1979 | Nobles | ............ | E05B 67/003 |
| | | | | 70/18 |
| 4,288,188 A | 9/1981 | Smith | | |
| 4,395,798 A * | 8/1983 | McVey | ............ | D07B 1/185 |
| | | | | 24/122.6 |
| 4,540,209 A * | 9/1985 | Cody | ............ | F16G 11/00 |
| | | | | 294/74 |
| 4,867,478 A * | 9/1989 | Anderson | ............ | A63C 11/005 |
| | | | | 280/814 |
| 5,735,877 A * | 4/1998 | Pagedas | ............ | A61B 17/0487 |
| | | | | 606/148 |
| 5,738,398 A * | 4/1998 | Miano | ............ | A44B 18/00 |
| | | | | 24/442 |
| 7,219,398 B1 * | 5/2007 | Hunt | ............ | F16G 11/00 |
| | | | | 24/115 R |
| 2005/0006910 A1 | 1/2005 | Foigel et al. | | |
| 2005/0231365 A1 | 10/2005 | Tester et al. | | |
| 2009/0071211 A1 | 3/2009 | Stone et al. | | |
| 2010/0307674 A1 | 12/2010 | Mackay | | |
| 2015/0307281 A1 | 10/2015 | Gilg et al. | | |
| 2018/0118532 A1 * | 5/2018 | Worswick | ............ | B66D 1/34 |
| 2018/0119341 A1 * | 5/2018 | Worswick | ............ | D07B 1/185 |

OTHER PUBLICATIONS

Australian Examination Report mailed in AU 2017236648 dated Dec. 3, 2018.

\* cited by examiner

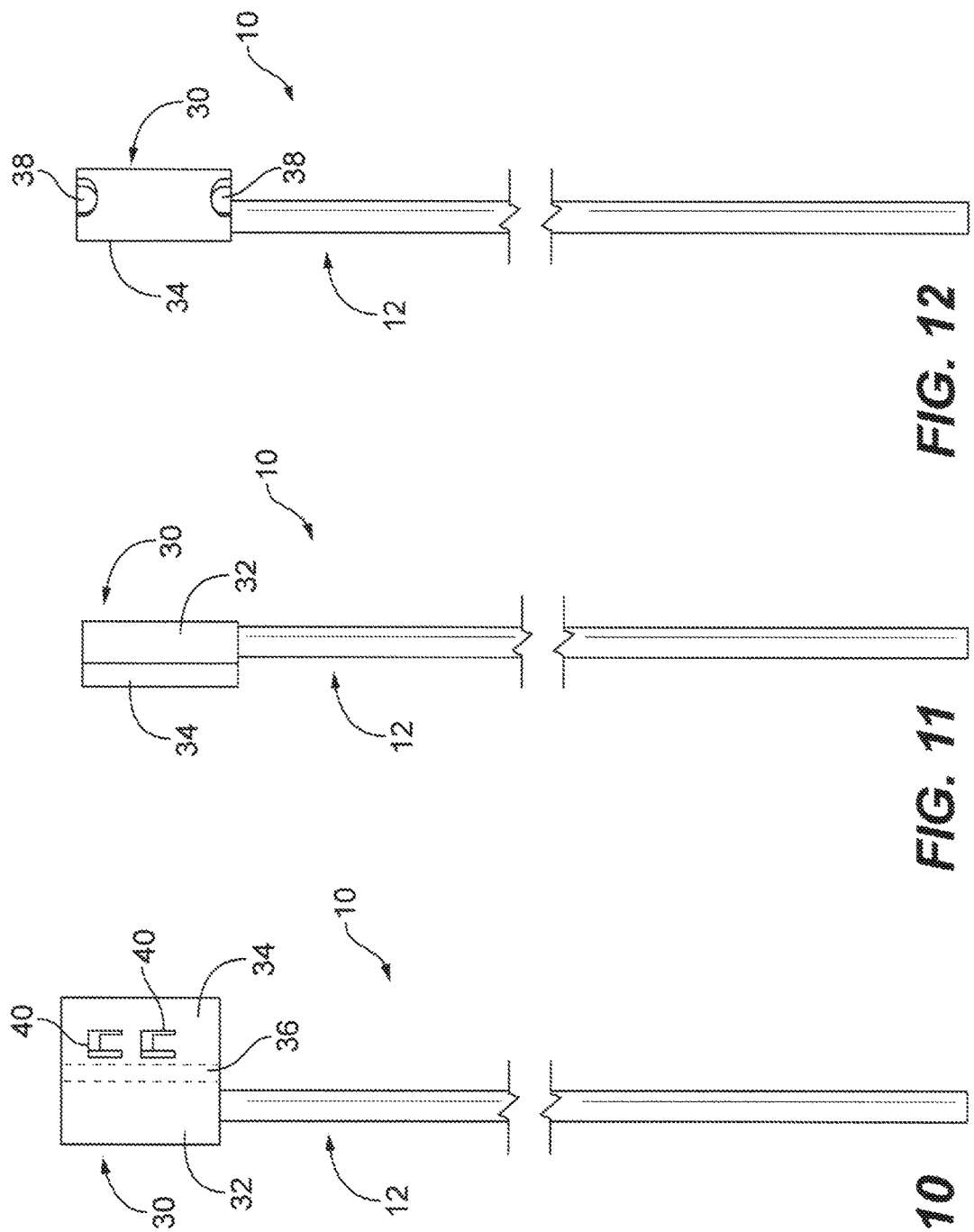

METAL STRAPS

CROSS-REFERENCE TO RELATED APPLICATIONS

The present disclosure is based on and claims benefit from U.S. Provisional Application Ser. No. 62/310,893 filed Mar. 21, 2016 entitled "Metal Straps", the entire contents of which are herein incorporated by reference.

BACKGROUND

Field

The present disclosure relates generally to metal straps for tying or bundling one or more items, and more particularly to metal straps having a wire cable with one end attached to a ferrule and a free end that can later be secured to the ferrule.

Description of the Related Art

In recent years, the use of photovoltaic arrays to provide electrical power in commercial, residential, and other environments has become popular. Photovoltaic arrays are typically composed of a number of photovoltaic modules set within a metallic frame, and a rail system that supports the photovoltaic modules. When installing a photovoltaic array, a number of photovoltaic modules are assembled onto the rail system. The metallic frames of the individual photovoltaic modules, and the structural pieces, e.g., the rails, on which the modules mount are generally made out of aluminum. Electrical power generated by such photovoltaic arrays is transferred to a distribution system using electrical cabling. Such electrical cabling is often routed along the rails and secured in place using plastic tie wraps, which often degrade in the weather over time.

Plastic cable ties and their accessories, such as mounting bases, have been in existence for many years. They are typically flat straps that limit the way the plastic cable ties can be can be wrapped around a bundle of items, or in tethering items to each other or to a support structure. The strength and durability of a plastic cable tie is dependent on the material that is used, as well as the shape and cross-sectional area of the plastic cable tie.

SUMMARY

The present disclosure provides descriptions of configurations for metal straps used to tie or bundle items together. In one exemplary configuration, the metal straps include a length of cable having a first clamp of a ferrule secured adjacent to one end of the cable, and a free end. The ferrule includes a second clamp that can receive the free end of the cable and can secure the cable to the ferrule after the cable is wrapped around one or more items. The second clamp includes at least one notch to temporarily hold the cable in place within the second clamp until the second clamp is secured to the cable. In another exemplary configuration, the metal straps include a length of cable having a first clamp of a ferrule secured adjacent to one end of the cable, and a free end. The ferrule includes a second clamp that has at least one self-locking member used to secure the free end of the cable to the ferrule after the cable is wrapped around one or more items.

The present disclosure also provides descriptions of configurations for metal strap kits used to tie or bundle items together. In an exemplary configuration, the metal strap kit includes a metal strap and a strap mount. The metal strap includes a length of cable having a first clamp of a ferrule secured adjacent to one end of the cable, and a free end. The ferrule has a second clamp that can receive the free end of the cable and can secure the cable to the ferrule after the cable is wrapped around one or more items. The second clamp includes at least one notch to temporarily hold the cable in place within the second clamp until the second clamp is secured to the cable. In another exemplary configuration, the metal strap includes a length of cable having a first clamp of a ferrule secured adjacent to one end of the cable, and a free end. The ferrule includes a second clamp that has at least one self-locking member used to secure the free end of the cable to the ferrule after the cable is wrapped around one or more items.

BRIEF DESCRIPTION OF THE DRAWINGS

The figures depict configurations for purposes of illustration only. One skilled in the art will readily recognize from the following description that alternative configurations of the structures illustrated herein may be employed without departing from the principles described herein, wherein:

FIG. 10 is a front elevation view of another exemplary configuration of a metal strap according to the present disclosure;

FIG. 11 is a left side elevation view of the metal strap of FIG. 10;

FIG. 12 is a right side elevation view of the metal strap of FIG. 10;

DETAILED DESCRIPTION

The present disclosure provides descriptions of configurations for metal straps used to tie or bundle items, such as electrical cables, together and/or to other structures. This specification and the accompanying drawings are to be regarded in an illustrative sense rather than a restrictive sense. Various modifications may be made thereto without departing from the spirit and scope of the present disclosure.

Figure 1:
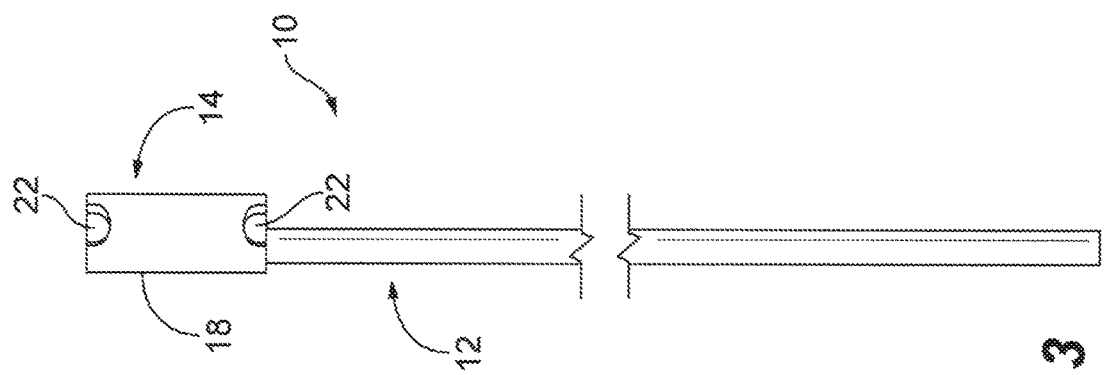
FIG. 1 is a front elevation view of an exemplary configuration of a metal strap according to the present disclosure.
Figure 2:
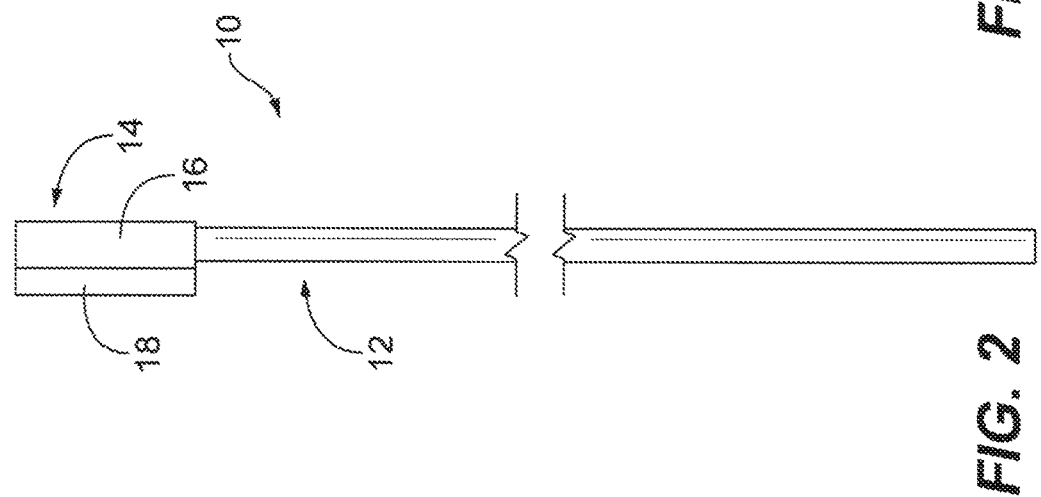
FIG. 2 is a left side elevation view of the metal strap of FIG. 1.
Figure 3:
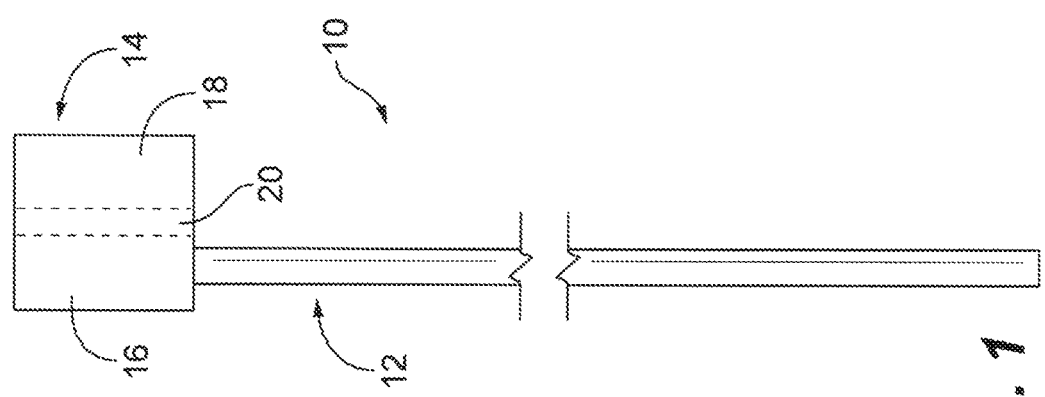
FIG. 3 is a right side elevation view of the metal strap of FIG. 1.

Referring to FIGS. 1-3, an exemplary configuration of a metal strap according to the present disclosure is shown. In this exemplary configuration, the metal strap 10 has a length of metal cable or metal rope 12, and ferrule 14 secured to one end or adjacent to one end of the metal cable or metal rope 12. For ease of description, the metal strap may also be referred to herein as the "strap" in the singular, and the "straps" in the plural. Further, the metal cable or metal rope may also be referred to herein as the "cable" in the singular, and the "cables" in the plural. The cable 12 may be formed of environmentally durable metal, such as stainless steel or galvanized steel, and can comprise either a stranded wire rope or cable, seen in FIG. 4, or a solid wire, seen in FIG. 5. The length of the cable may vary depending upon the size of the items to be tied together or bundled. For example, the cable 12 may be in the range from about 4 inches to about 3 feet in length. The diameter of the cable may also vary based upon the load weight of the items to be tied or bundled. In general, the durability and strength of the cable 12 is dependent on the material that the cable is made of, as well as the diameter of the cable.

Figure 4:
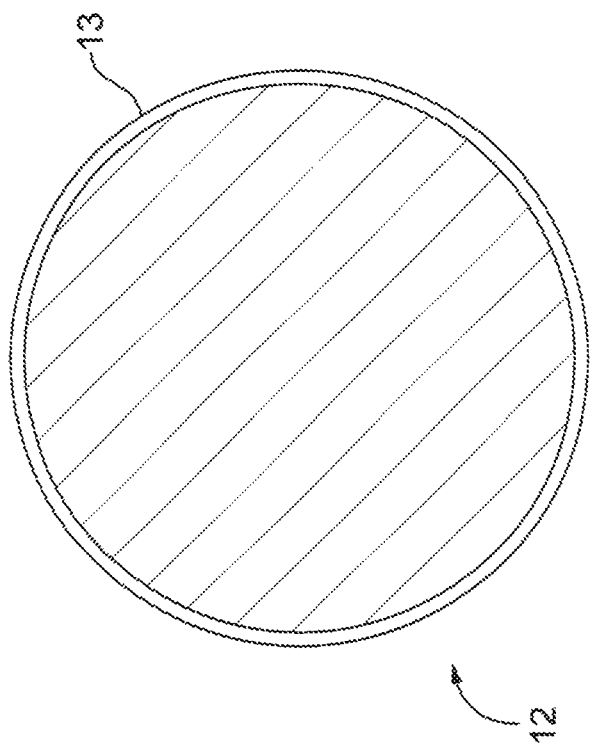
FIG. 4 is a cross-sectional view of a stranded wire cable used in the metal strap according to the present disclosure.
Figure 5:
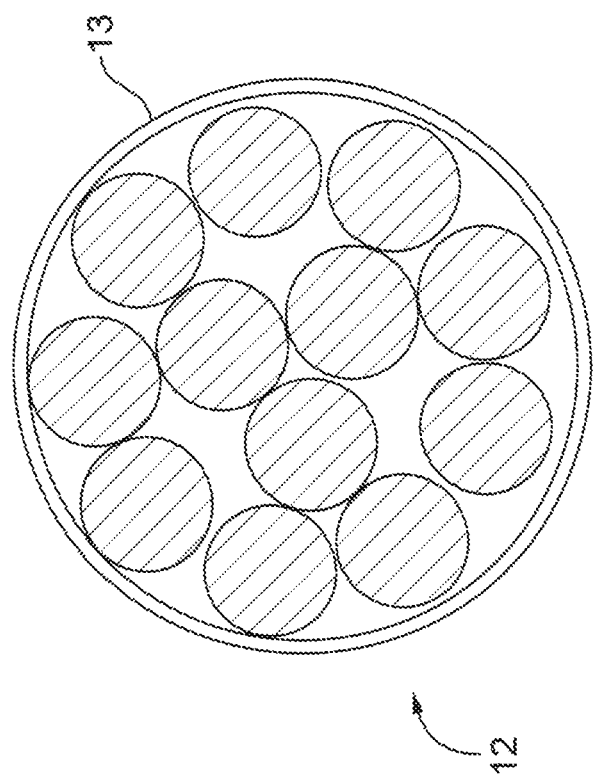
FIG. 5 is a cross-sectional view of a solid wire used in the metal strap according to the present disclosure.

As seen in FIGS. 4 and 5, the cable 12 may also be jacketed with a coating 13 to protect the items being tied or bundled from being damaged by the cable, and to limit the wear and tear on the cable 12 that may be caused by weather conditions. In addition, in instances where the cable is a stranded cable, the coating may also protect the inner wire strands from corrosion. The coating is preferably an environmentally durable material that is flexible to bend with the cable. Examples of such coatings include PVC, polypropylene, nylon, vinyl, urethane, and polyester coatings.

Figure 6:
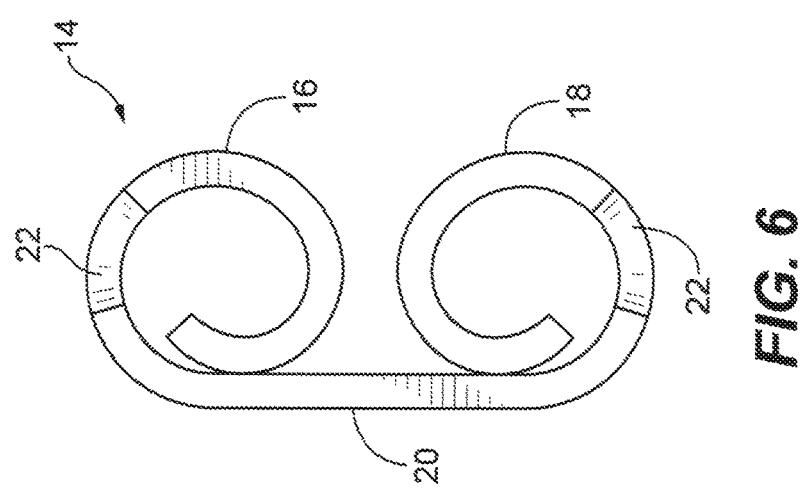
FIG. 6 is a top plan view of an exemplary configuration of a ferrule used with the metal strap of FIG. 1.

The ferrule 14 is a multi-clamp ferrule with, in the exemplary configuration shown in FIG. 6, two clamps 16 and 18 joined together by a main body 20. The clamps may be integrally formed into the main body 20 or secured to the main body 20 using, for example, mechanical fasteners such as by welding, or adhesives. The ferrule 14 may be formed of environmentally durable metal, such as stainless steel or galvanized steel. In addition, the ferrule 14 may be jacketed with a coating to protect the items being tied or bundled from being damaged by the ferrule, and to limit the wear and tear on the ferrule 14 that may be caused by weather conditions. The coating is preferably an environmentally durable material. Examples of such coatings include PVC, polypropylene, nylon, vinyl, urethane, and polyester coatings.

The first clamp 16 of the ferrule 14 is pre-attached to one end of the cable 12 by crimping the clamp to the cable. The second clamp 18 of the ferrule 14 is used to receive the free end of the cable when tying or bundling items. At least the second clamp 18 includes a notch 22 at each end of the second clamp 18, as shown in FIGS. 3 and 6. The notches 22 are used to temporarily hold the cable 12 within the second clamp 18 so that a technician can secure the cable 12 to the ferrule 14 by, for example, crimping the second clamp 18.

The notches 22 apply a friction force to the cable 12 sufficient to temporarily hold the cable 12 within the second clamp 18. The first clamp 16 may also include a notch 22 so that the ferrule 14 can be a universal ferrule where either the first clamp 16 or the second clamp 18 may be pre-attached to the cable 12.

Figure 7:
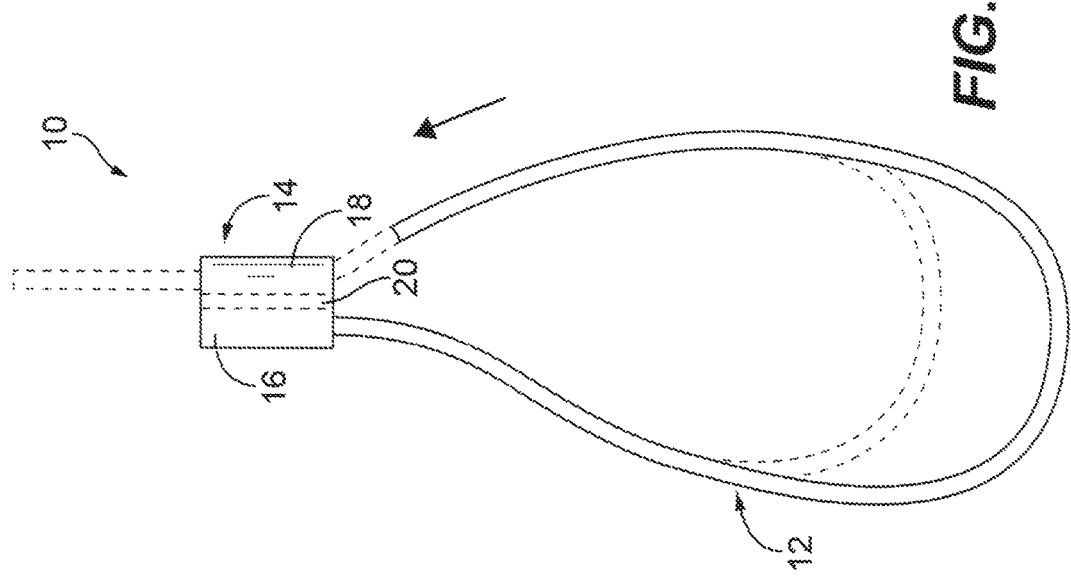
FIG. 7 is a plan view of the metal wire strap of FIG. 1, illustrating a free end of the metal strap inserted into the ferrule of FIG. 6 to form a loop.
Figure 9:
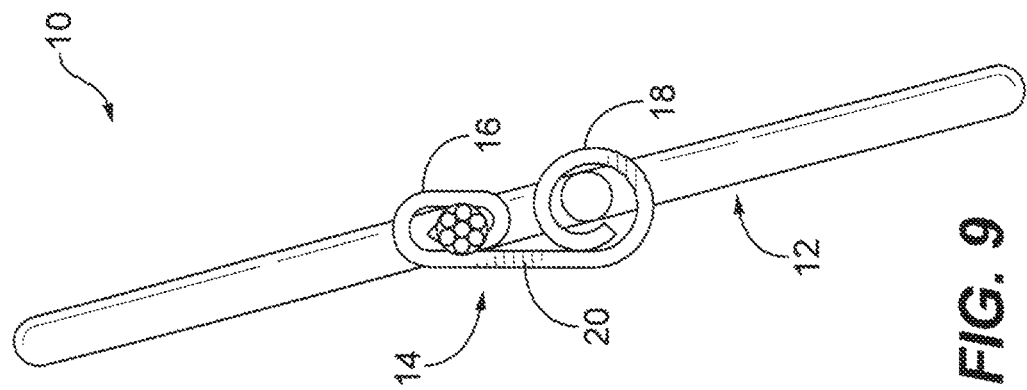
FIG. 9 is a top elevation view of the metal strap of FIG. 6, illustrating one end of the metal strap secured to the ferrule, and the free end of the metal strap inserted into the ferrule.
Figure 8:
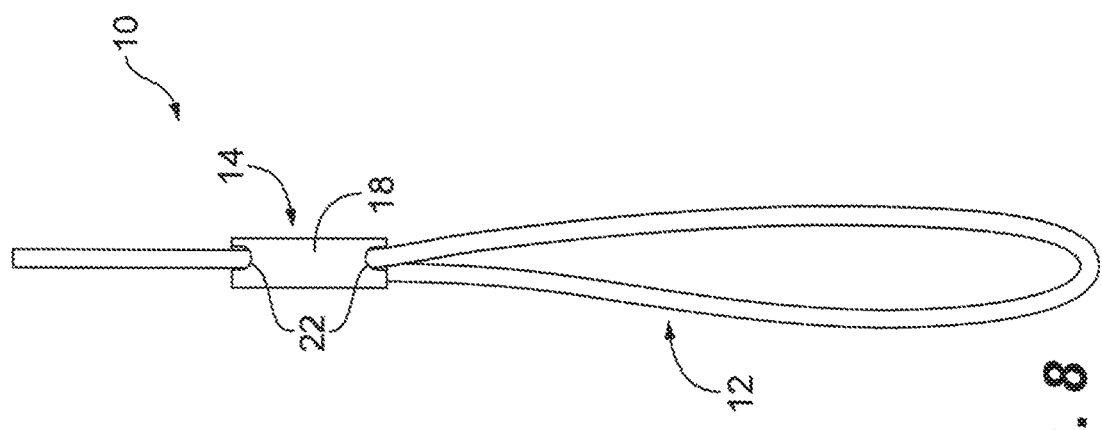
FIG. 8 is a side view of the metal strap of FIG. 6.

Referring to FIGS. 7-9, to tie or bundle one or more items, a technician would wrap or run the free end of the cable around the one or more items, such as electrical cables, and insert the free end of the cable 12 into one end of the clamp 18. The free end of the cable 12 would then be passed out of the other end of the clamp 18 forming a loop around the one or more items to be tied. The technician would then pull the free end of the cable 12 until it is snug or tight, as desired, to the one or more items being tied or bundled. The friction force applied by the notches 22 on the cable 12 would then temporarily hold the cable in place until the technician secures the cable to the ferrule 14 by, for example, crimping the second clamp 18.

Referring to FIGS. 10-12, another exemplary configuration of a strap according to the present disclosure is shown. In this exemplary configuration, the strap 10 has a length of cable 12 and a ferrule 30 secured to one end of the cable, similar to the configuration of FIGS. 1-3. The cable 12 is the same as the cable described above. However, in this exemplary configuration the ferrule 30 differs. This ferrule 30 is also a multi-clamp ferrule with, in the exemplary configuration shown in FIG. 13, two clamps 32 and 34 joined together by a main body 36. The clamps 32 and 34 may be integrally formed into the main body 36 or secured to the main body 36 using, for example, mechanical fasteners such as by welding, or adhesives. The ferrule 30 may include notches 38 which are the same as notches 22 and perform the same function as notches 22 described above. The ferrule 30 may be formed of environmentally durable metal, such as stainless steel or galvanized steel. In addition, the ferrule 30 may be jacketed with a coating to protect the items being tied or bundled from being damaged by the ferrule, and to limit the wear and tear on the ferrule 30 that may be caused by weather conditions. The coating is preferably an environmentally durable material. Examples of such coatings include PVC, polypropylene, nylon, vinyl, urethane, and polyester coatings.

Figure 13:
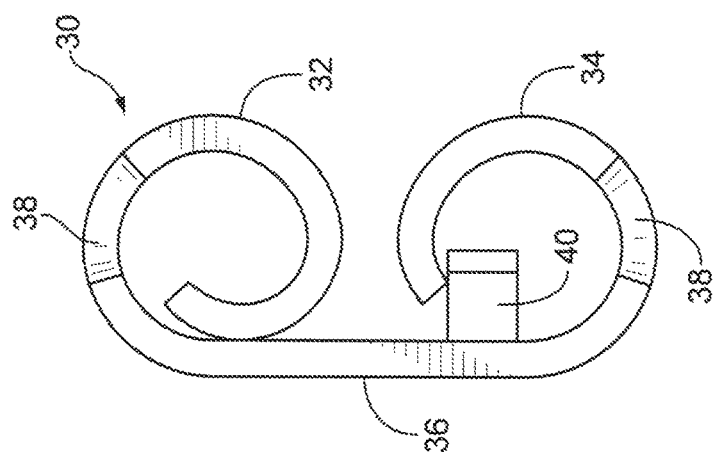
FIG. 13 is a top plan view of an exemplary configuration of a ferrule used with the metal strap of FIG. 10.

The first clamp 32 is pre-attached to one end of the cable 12 by, for example, crimping the clamp 32 to the cable. The second clamp 34 of the ferrule 30 is used to receive the free end of the cable when tying or bundling items. The ferrule 30 also includes one or more self-locking members 40, e.g., self-locking tabs, within at least the second clamp 34. In the configuration of FIGS. 10-12, there are two self-locking members 40 within the second clamp 34. However, there may be one self-locking member 40 within the second clamp 34, or there may be more than two self-locking members 40 within the second clamp 34. The self-locking members 40 may be formed into the second clamp 34 or secured to the second clamp using, for example, mechanical fasteners such as by welding or adhesives. In one exemplary configuration, each self-locking member 40 may be in the form of a tab extending into the opening of the second clamp, as shown in FIG. 13. The self-locking members 40 are able to flex while the cable 12 is passed through the second clamp 34 imparting little resistance to the forward advancement of the cable through the second clamp, while imparting sufficient resistance to rearward movement of the cable to prevent withdrawal of the cable 12 from the second clamp 34 of the ferrule 30. While the self-locking members are shown in the second clamp 34, one skilled in the art would recognize that the self-locking members may be included in the first clamp 32 as well as the second clamp 34.

Figure 14:
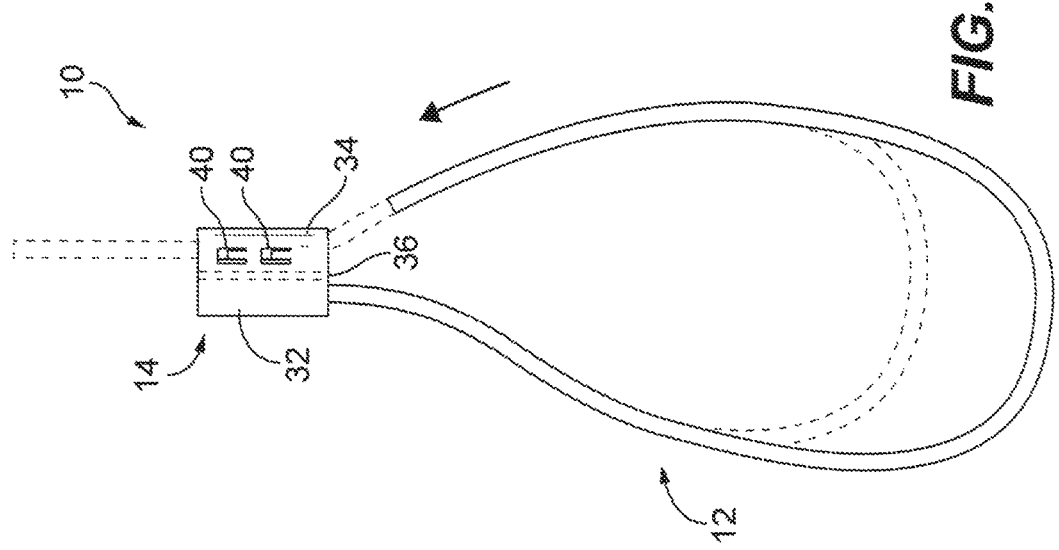
FIG. 14 is a plan view of the metal wire strap of FIG. 10, illustrating a free end of the metal strap inserted into the ferrule of FIG. 13 to form a loop.
Figure 16:
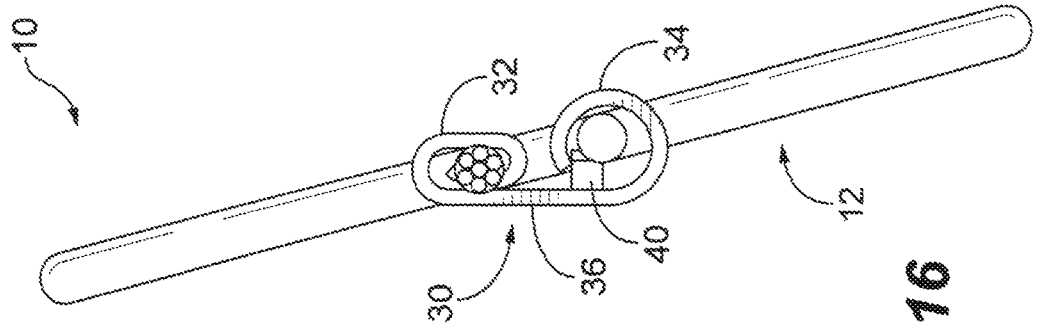
FIG. 16 is a top elevation view of the metal strap of FIG. 13, illustrating one end of the metal strap secured to the ferrule, and the free end of the metal strap inserted into the ferrule.
Figure 15:
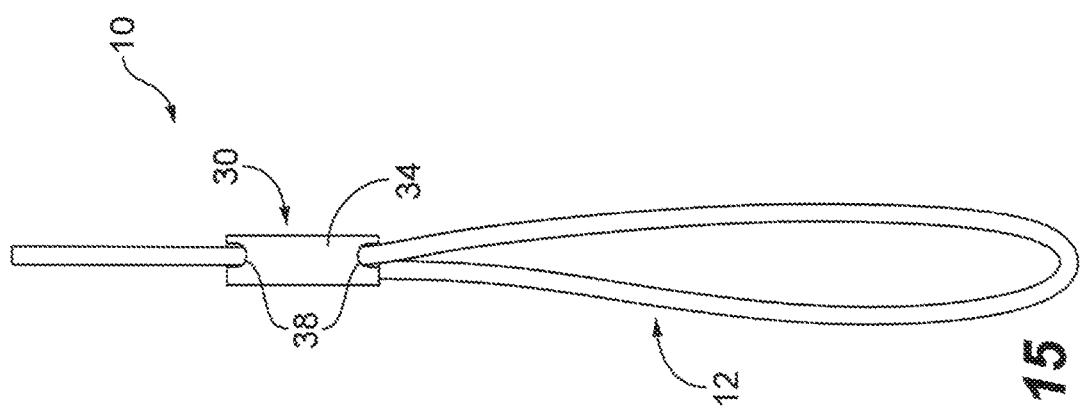
FIG. 15 is a side view of the metal strap of FIG. 13.

Referring to FIGS. 14-16, to tie or bundle one or more items, a technician would wrap or run the free end of the cable around the one or more items, such as electrical cables, and insert the free end of the cable 12 into one end of the second clamp 34. The free end of the cable 12 would then be passed through the second clamp 34 past the self-locking members 40, and out of the other end of the second clamp forming a loop around the one or more items to be tied. The technician would then pull the free end of the cable 12 until it is snug or tight, as desired, to the one or more items being tied. The self-locking members 40 would secure the snug or tightened cable and thus the one or more items being tied.

Figure 17:
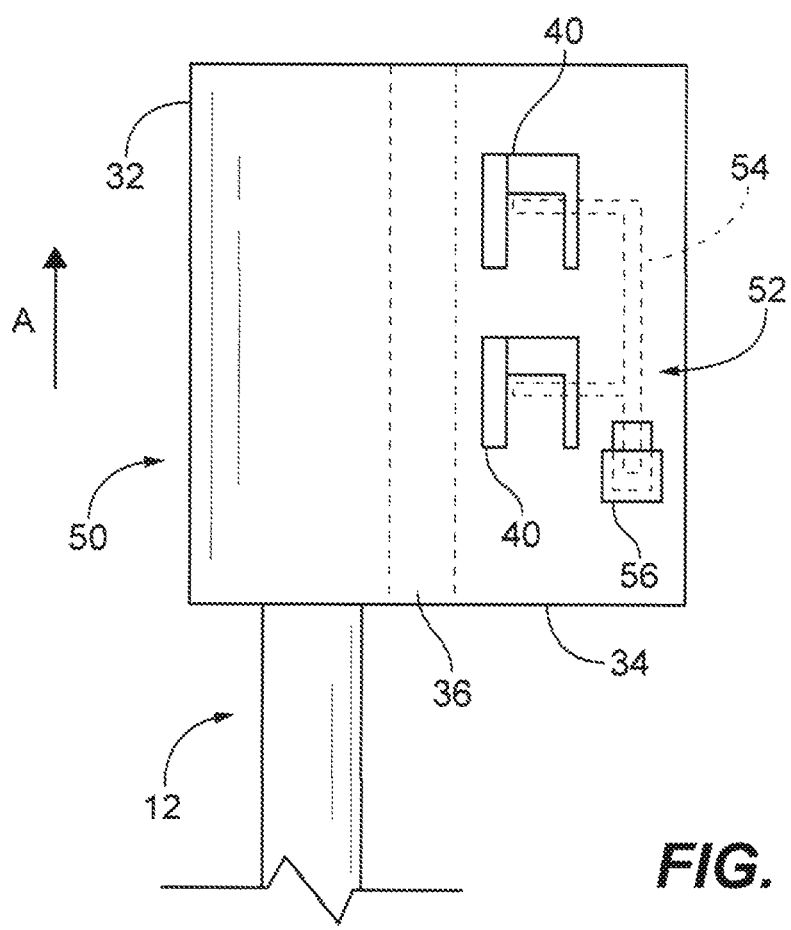
FIG. 17 is a front plan view of another configuration of a ferrule used with the metal strap of the present disclosure, illustrating a release mechanism for selectively releasing the free end of the metal strap from the ferrule.

Referring to FIG. 17, another exemplary configuration the ferrule is shown. In this configuration, the ferrule 50 is the same as ferrule 30 and also includes a release mechanism 52 for selectively releasing the self-locking members 40. The release mechanism 52 may be a release arm 54 within the opening of the second clamp 34 that is secured to a push lever 56 on an outer surface of the second clamp, as shown. When the push lever 56 is pushed in the direction of arrow "A," the release arm 54 engages the self-locking members 40 causing the self-locking members to flex away from the cable 12 permitting the cable 12 to be withdrawn from the ferrule 50.

Figure 18:
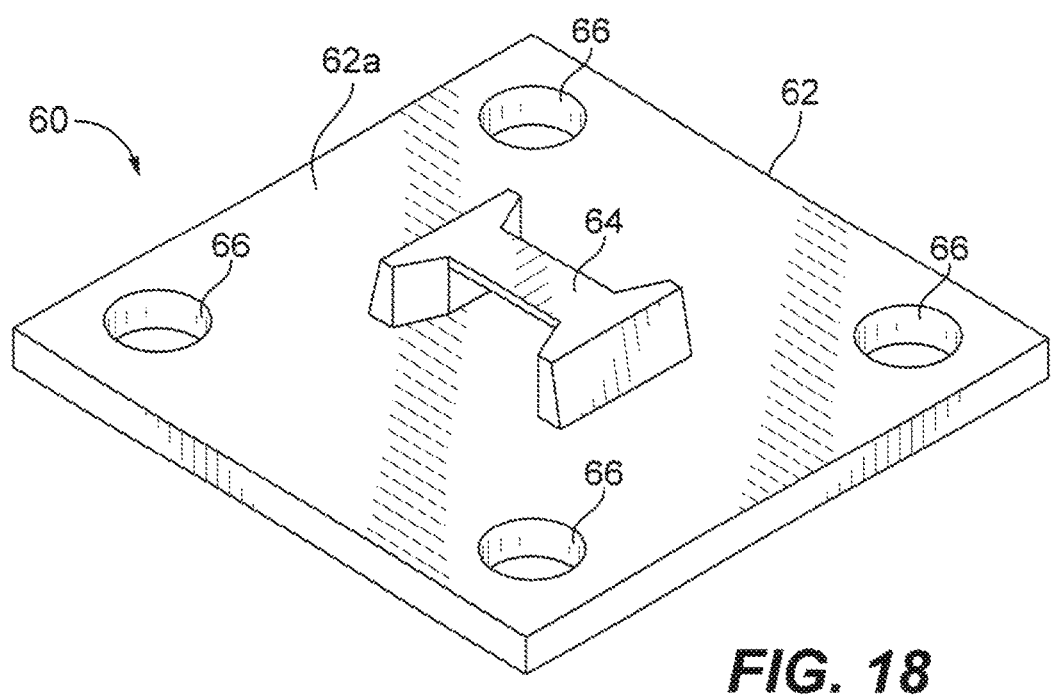
FIG. 18 is a top perspective view of an exemplary configuration of a strap mount used to mount a metal strap to a structure.
Figure 19:
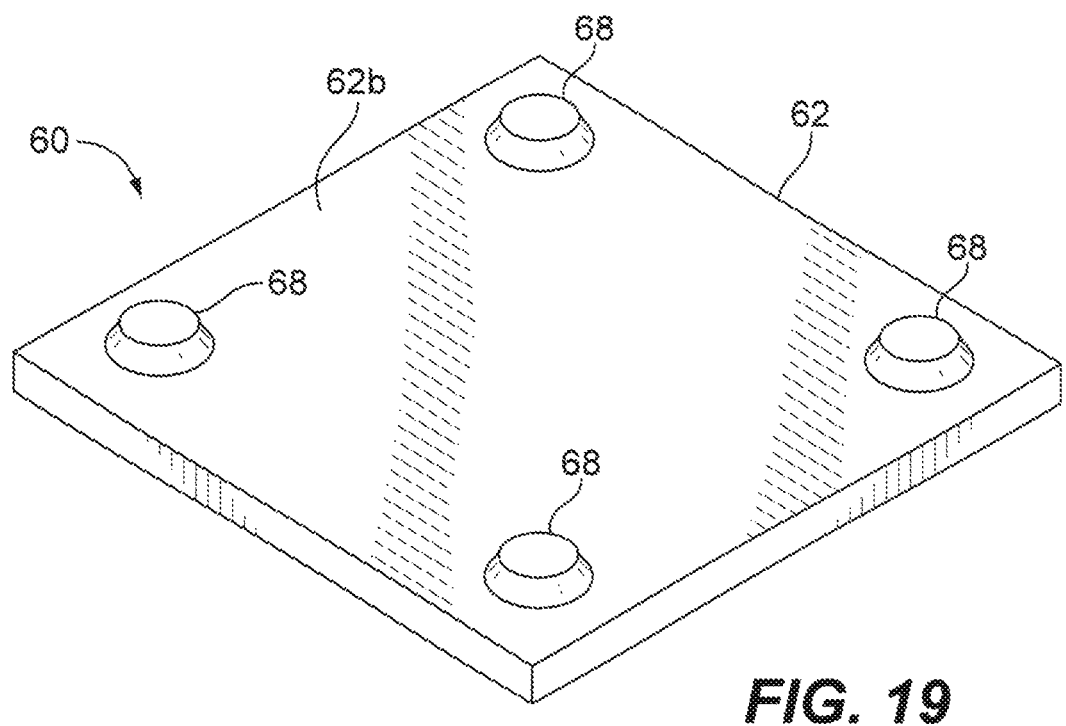
FIG. 19 is a bottom perspective view of the strap mount of FIG. 18.

Referring to FIG. 18, an exemplary configuration of a strap mount is shown. In this configuration, the strap mount 60 includes a base 62 and a strap coupling arm 64 secured to a top surface 62a of the base. The base also includes one or more mounting holes 66 so that the strap mount 60 can be secured to a structure, such as a rail of a photovoltaic array. In another configuration, a bottom surface 62b of the base 62 may have an adhesive pad attached thereto that may be used to secure the strap mount 60 to the structure. The strap mount 60 may be formed of environmentally durable metal, such as stainless steel or galvanized steel. In addition, the strap mount 60 may be jacketed with a coating to protect the items being tied or bundled from being damaged by the strap mount, and to limit the wear and tear of the strap mount 60 that may be caused by weather conditions. The coating is preferably an environmentally durable material. Examples of such coatings include PVC, polypropylene, nylon, vinyl, urethane, and polyester coatings. In another configuration, seen in FIG. 19, the bottom surface 62b of the base 62 may include one or more raised surfaces 68, sometimes called volcanoes, that can pierce through non-conductive coatings on the structure in the event it is desired to electrically bond the strap mount 60 to the structure. The raised surfaces 68 in the exemplary configuration are associated with the mounting holes 66. However, the one or more raised surfaces may be placed anywhere on the bottom surface 62b of the base 62.

While illustrative configurations of the present disclosure have been described and illustrated above, it should be understood that these are exemplary of the disclosure and are not to be considered as limiting. Additions, deletions, substitutions, and other modifications can be made without departing from the spirit or scope of the present disclosure. Accordingly, the present disclosure is not to be considered as limited by the foregoing description.

What is claimed is:

1. A metal strap for bundling one or more items, the metal strap comprising:
    a length of cable having a first end and a free end;
    a ferrule having a first clamp crimped to the cable at or adjacent the first end of the cable such that the cable is secured to the first clamp and extends from a first end of the first clamp, and a second clamp that comprises a first end positioned adjacent the first end of the first clamp and a second end aligned with the first end of the second clamp such that the second clamp can receive the free end of the cable in the first end of the second clamp and permits the free end of the cable to exit the second clamp through the second end of the second clamp, the second clamp is capable of being crimped to secure the second clamp to the cable and further comprising a first notch in the first end or the second end, wherein the notch temporarily holds the cable in place within the second clamp until the second clamp is secured to the cable.

2. The metal strap according to claim 1, wherein the cable and ferrule are made of stainless steel.

3. The metal strap according to claim 1, wherein the cable and ferrule are made of galvanized steel.

4. The metal strap according to claim 1, wherein the cable is coated with an environmentally durable material.

5. The metal strap according to claim 4, wherein the environmentally durable material comprises PVC, polypropylene, nylon, vinyl, urethane, or polyester.

6. The metal strap according to claim 1, wherein the cable is a stranded wire cable.

7. The metal strap according to claim 1, wherein the cable is a solid wire cable.

8. The metal strap according to claim 1, wherein the ferrule is coated with an environmentally durable material.

9. The metal strap according to claim 8, wherein the environmentally durable material comprises PVC, polypropylene, nylon, vinyl, urethane, or polyester.

10. The metal strap according to claim 1, wherein the second clamp further comprises a second notch, and wherein the first notch is positioned at the first end of the second clamp and the second notch is positioned at the second end of the second clamp.

11. A metal strap for bundling one or more items, the metal strap comprising a length of cable having a first clamp of a ferrule secured adjacent to one end of the cable, and a free end, wherein a second clamp of the ferrule has an outer wall with a hollow center capable of receiving the free end of the cable and at least one self-locking tab extending from the outer wall into the hollow center of the second clamp and used to secure the free end of the cable to the ferrule by imparting little resistance to forward advancement of the cable through the second clamp, while imparting sufficient resistance to rearward movement of the cable to prevent withdrawal of the cable from the second clamp, wherein the second clamp comprises a release mechanism that when activated causes the self-locking tab to flex away from the cable permitting the cable to be removed from the second clamp.

12. The metal strap according to claim 11, wherein the cable and ferrule are made of stainless steel.

13. The metal strap according to claim 11, wherein the cable and ferrule are made of galvanized steel.

14. The metal strap according to claim 11, wherein the cable is coated with an environmentally durable material.

15. The metal strap according to claim 14, wherein the environmentally durable material comprises PVC, polypropylene, nylon, vinyl, urethane, or polyester.

16. The metal strap according to claim 11, wherein the cable is a stranded wire cable.

17. The metal strap according to claim 11, wherein the cable is a solid wire cable.

18. The metal strap according to claim 11, wherein the ferrule is coated with an environmentally durable material.

19. The metal strap according to claim 18, wherein the environmentally durable material comprises PVC, polypropylene, nylon, vinyl, urethane, or polyester.

20. A metal strap kit for bundling one or more items, the strap kit comprising a metal strap and a strap mount, wherein the metal strap comprises:

a length of cable having a first end and a free end;

a ferrule having a first clamp crimped to the cable at or adjacent the first end of the cable such that the cable is secured to the first clamp and extends from a first end of the first clamp, and a second clamp that comprises a first end positioned adjacent the first end of the first clamp and a second end aligned with the first end of the second clamp such that the second clamp can receive the free end of the cable in the first end of the second clamp and permits the free end of the cable to exit the second clamp through the second end of the second clamp, the second clamp is capable of being crimped to secure the second clamp to the cable and further comprising a first notch in the first end or the second end, wherein the notch temporarily holds the cable in place within the second clamp until the second clamp is secured to the cable.

21. A metal strap kit for bundling one or more items, the strap kit comprising a metal strap and a strap mount, wherein the metal strap comprises a length of metal cable having a first clamp of a metallic ferrule secured adjacent to one end of the metal cable, and a free end, wherein a second clamp of the metallic ferrule has an outer wall with a hollow center capable of receiving the free end of the metal cable and at least one self-locking member extending from the outer wall into the hollow center and used to secure the free end of the metal cable to the metallic ferrule by imparting little resistance to forward advancement of the metal cable through the second clamp, while imparting sufficient resistance to rearward movement of the metal cable to prevent withdrawal of the metal cable from the second clamp.

\* \* \* \* \*